US008730029B2

(12) United States Patent
Petricoin, Jr.

(10) Patent No.: US 8,730,029 B2
(45) Date of Patent: May 20, 2014

(54) TABLET COMPUTER AS USER INTERFACE OF SECURITY SYSTEM

(75) Inventor: Dennis M. Petricoin, Jr., Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 13/246,711

(22) Filed: Sep. 27, 2011

(65) Prior Publication Data
US 2013/0076507 A1    Mar. 28, 2013

(51) Int. Cl.
*G08B 21/00* (2006.01)

(52) U.S. Cl.
USPC ................. 340/539.11; 340/539.16; 340/541

(58) Field of Classification Search
USPC .......... 340/539.16, 539.11, 539.13, 541, 5.8, 340/5.82; 348/143
See application file for complete search history.

(56) References Cited

U.S. PATENT DOCUMENTS

| 7,136,709 | B2 * | 11/2006 | Arling et al. ..................... 700/65 |
| 2005/0032503 | A1 | 2/2005 | Goto et al. |
| 2005/0128072 | A1 | 6/2005 | Li |
| 2005/0275530 | A1 * | 12/2005 | Kates ....................... 340/539.22 |
| 2007/0205888 | A1 * | 9/2007 | Lee et al. ................. 340/539.18 |
| 2008/0191861 | A1 | 8/2008 | Mason et al. |
| 2009/0045952 | A1 | 2/2009 | Bahari |
| 2009/0232307 | A1 | 9/2009 | Romanczyk et al. |
| 2009/0243834 | A1 | 10/2009 | Sennett et al. |
| 2010/0048252 | A1 * | 2/2010 | Kang et al. ..................... 455/566 |

* cited by examiner

*Primary Examiner* — Jeffery Hofsass
(74) *Attorney, Agent, or Firm* — Michael Best & Friedrich LLP

(57) ABSTRACT

A building security system including a security sensor configured to sense a security breach associated with a building. An off-the-shelf portable personal electronic computing device is communicatively coupled to the security sensor and to a central monitoring station. The computing device is programmable within the building to transmit an alarm signal to the central monitoring station in response to the security sensor sensing a security breach associated with the building.

14 Claims, 4 Drawing Sheets

TABLET COMPUTER AS USER INTERFACE OF SECURITY SYSTEM

BACKGROUND

1. Field of the Invention

The patent relates to the field of surveillance systems and more particularly to surveillance systems having a user interface.

2. Description of the Related Art

In the field of surveillance and security systems, one of the most expensive and visible parts of a security system is its user interface. These expensive devices need to be very impressive and interesting to end users in order to justify their high costs, and often include touch screens. Typically, in order to keep costs down, the user interfaces include inexpensive components and do not include state of the art technology. However, the touch screen user interfaces of surveillance and security systems are manufactured in smaller volume than are similar, but more widely used personal electronic devices. Thus, the touch screen user interfaces are necessarily more expensive than personal electronic devices.

For the above reasons, there is a constant balancing that occurs in the market that makes it difficult for the security system manufacture to provide what the customer perceives to be a good value. The customer expects that for a given price they can buy a security system user interface that is thin, smooth, feature-rich, and hi-tech. However, the manufacturer charges more than the customer expects for security system user interface that is thick, fairly unattractive, and feature-poor.

What is neither disclosed nor suggested by the prior art is a surveillance security system in which a personal mobile electronic device, such as a tablet computer, is used as the main user interface of a security system without the use of a permanent dedicated control panel. Nor does the prior art disclose such a mobile device also being used to perform non-security functions. Further, the prior art does not disclose such a mobile device that gives higher priority to its security-related functions.

SUMMARY

The invention is directed to a security system in which a tablet computer is used as the user interface. That is, the invention makes use of lower cost, but commercially available, tablet computers to provide the specific application of a wall mounted security interface. The tablet computer may be mounted permanently or semi-permanently, and may have a wired or wireless connection to the security system. The tablet retains non-security functionality, but gives its security functions higher priority. The tablet may be mounted on the wall using a special dock which may provide power, connection to the security system, and other interfaces. The tablet's built-in camera may enable video chats with the security office; video messages; taking pictures of the person interfacing with the system for logging; reading a QR code to identify the user or other feature; and facial recognition. The tablet's built in microphone may enable audio chats with the security office; audio messages; and voice recognition.

In one embodiment, a personal mobile electronic device, such as a tablet computer, is used as the main user interface of a security system without the use of a permanent dedicated control panel. The mobile device may also be used to perform non-security functions. However, the mobile device may give higher priority to its security-related functions.

A security user interface of the invention may include a commercially available tablet computer mounted permanently or semi-permanently. Thus, the additional features that such tablet computers come with may be taken advantage of. A security user interface of the invention may provide a higher price-to-performance ratio than is currently commercially available in the security market. Also, a security user interface of the invention may be easy to update with additional functionality without a lot of development effort by the manufacturer.

In one embodiment, the invention includes a) a tablet computer running some operating system; b) a permanent or semi-permanent mounting device for mounting the tablet computer to a fixed surface, such as a wall; and c) a wired or wireless interface between the tablet computer and the security system. The interface between the tablet computer and the security system may be a fundamental application that runs on the tablet computer.

In one aspect, the invention includes a building security system having a security sensor configured to sense a security breach associated with a building. An off-the-shelf portable personal electronic computing device is communicatively coupled to the security sensor and to a central monitoring station. The computing device is programmable within the building to transmit an alarm signal to the central monitoring station in response to the security sensor sensing a security breach associated with the building.

In another aspect, the invention includes a building security system having a security sensor configured to sense a security breach associated with a building. An off-the-shelf portable personal electronic computing device is communicatively coupled to the security sensor and to a central monitoring station. The computing device performs security functions including transmitting an alarm signal to the central monitoring station in response to the security sensor sensing a security breach associated with the building. The computing device also performs a non-security function including word processing, electronic mail, electronic instant messaging with another personal electronic computing device, capturing photographic images, interpreting user writing with a stylus on a touch-sensitive screen, and/or internet browsing.

In still another aspect, the invention includes a building security system having a plurality of security sensors configured to sense a security breach associated with a building. An off-the-shelf portable personal electronic computing device is communicatively coupled to the security sensors and to a central monitoring station. The computing device performs security functions including transmitting an alarm signal to the central monitoring station in response to at least one of the security sensors sensing a security breach associated with the building. The computing device also performs a plurality of non-security functions including word processing, electronic mail, electronic instant messaging with another personal electronic computing device, capturing photographic images, interpreting user writing with a stylus on a touch-sensitive screen, and/or internet browsing. The computing device assigns higher priority to each of the security functions than to any one of the non-security functions such that the computing device performs each pending security function before performing any pending non-security function.

The security applications and functions performed by the tablet computer are in addition to the basic, non-security functions of the tablet computer. According to the invention, the hardware and operating system platform of the tablet computer are used to perform the basic functions of the security system. The invention further enables the tablet computer to perform security functions in addition to the non-security functions that the tablet computer is already programmed to perform off-the-shelf.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
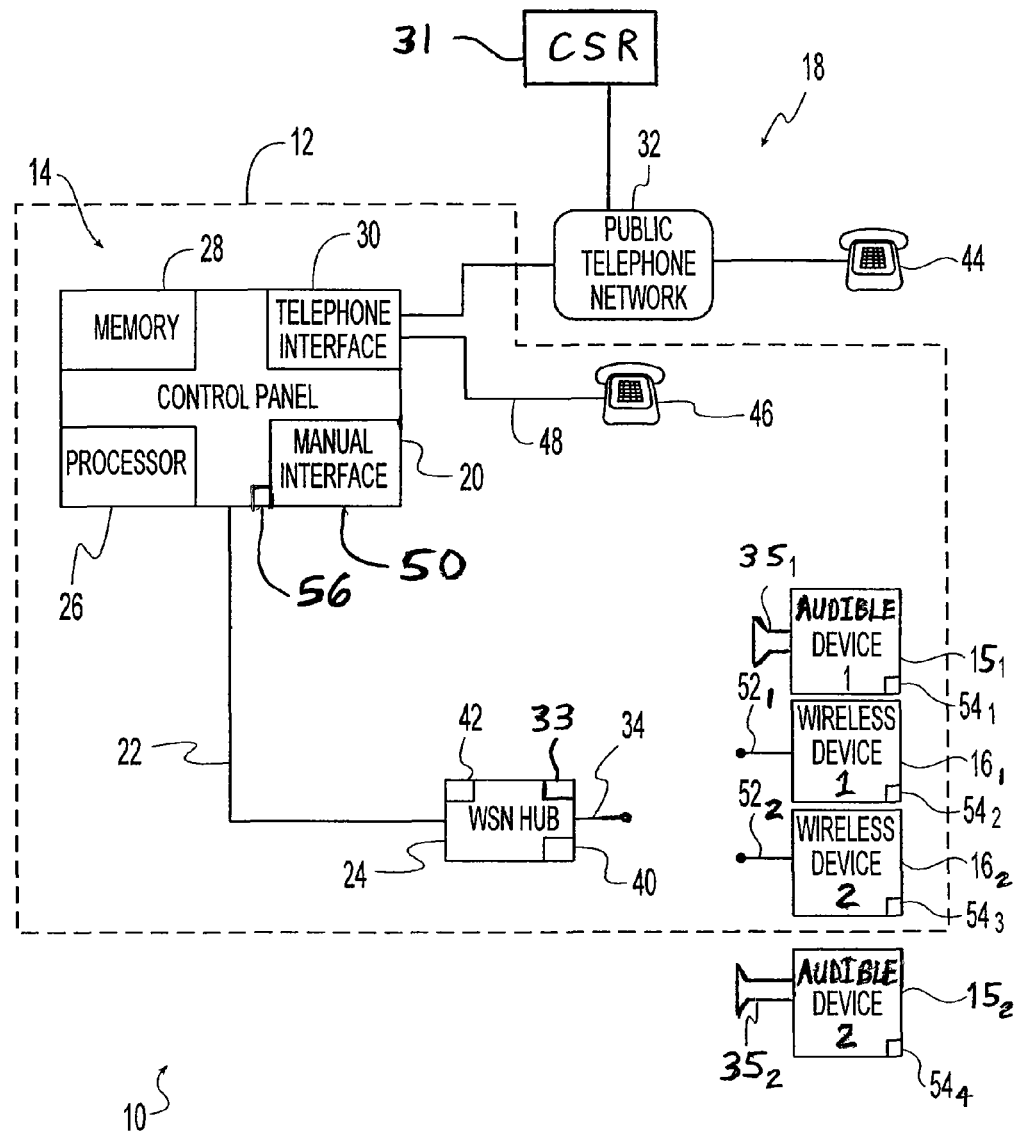
FIG. 1 is a block diagram of one embodiment of a building security arrangement of the invention.

Corresponding reference characters indicate corresponding parts throughout the several views. Although the drawings represent embodiments of the invention, the drawings are not necessarily to scale and certain features may be exaggerated in order to better illustrate and explain the invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring now to the drawings, and particularly to FIG. 1, there is shown one embodiment of a security system 10 of the invention for a structure 12 such as a building. However, system 10 may be used to secure other spaces, such as outdoor areas, subterranean rooms and passages, and zones of air space. System 10 includes a system controller 14, audible security devices $15_1$, $15_2$, non-audible wireless security devices $16_1$, $16_2$, and an installer interface 18. Audible security devices $15_1$, $15_2$ may be stand alone off-the-shelf security devices which may be designed by their manufacturer to be operable independently of the remainder of security system 10.

System controller 14 includes a control device in the form of a control panel 20 electrically connected via an option bus 22 to a wireless sensor network (WSN) hub 24, which also may be referred to as a "wLSN hub". Control panel 20 may include a processor 26, a memory device 28, a telephone/computer interface 30, and a manual interface 50. According to the invention, control panel 20 may be in the form of a commercially available tablet computer or similar personal electronic computing and/or communication device. In one embodiment, control panel 20 is in the form of an iPad2 tablet computer marketed by Apple Inc. Control panel 20 may be a stand alone off-the-shelf tablet computer which may be designed by its manufacturer to be operable independently of the remainder of security system 10.

It is possible in some embodiments, for telephone/computer interface 30 to be an add-on component that is not included in the off-the-shelf tablet computer as the tablet computer is commercially sold through retail outlets. However, many commercially available tablet computers include a telephone/computer interface 30 in the form of a security interface for remote access, or on-site access.

Processor 26 may coordinate communication with the various system components including installer interface 18 and WSN hub 24. Memory 28 may include software for interpreting signals from audible devices 15, wireless devices 16 and installer interface 18, and deciding based thereon whether to transmit an alarm signal from control panel 20. Memory 28 may also serve as a database for audible devices 15 and wireless devices 16. The alarm signal may be used to activate an audible alarm (not shown) within building 12, or to notify a central monitoring station or "central station receiver" (CSR) 31 such as a security company, fire station, or police station, for example, via public switched telephone network 32. Network 32 may otherwise be known as the network of the world's circuit-switched telephone networks. Memory 28 may also store identification information and configuration data for audible devices 15 and/or wireless devices 16, as described in more detail below.

In one embodiment, CSR 31 may remotely control system 10 through network 32, owing to the capability of a tablet computer to receive, act upon, and/or respond to remotely transmitted electronic commands. For example, CSR 31 may remotely arm or disarm system 10, and arm, disarm, configure or re-configure individual sensors.

WSN hub 24 may include a sound detector which may be in the form of a microphone 33 for receiving air-borne audible signals, such as audible alarm signals. The audible alarm signals may be transmitted from speakers or sirens $35_1$, $35_2$ of audible devices 15. Information from audible devices 15 may be passed by WSN hub 24 to control panel 20 via option bus 22. Control panel 20 may pass information to WSN hub 24 via option bus 22. WSN hub 24 may include a processor 40 and memory 42 for storing software, identification information associated with audible devices 15, and configuration data associated with audible devices 15.

WSN hub 24 may include an antenna element 34 for transmitting and receiving air-borne signals, such as radio frequency signals. The radio frequency signals may be received by and transmitted from, i.e., exchanged with, wireless devices 16. Information from wireless devices 16 may be passed by WSN hub 24 to control panel 20 via option bus 22. Control panel 20 may pass information to WSN hub 24 via option bus 22 for transmission to wireless devices 16 as necessary. WSN hub 24 may include a processor 40 and memory 42 for storing software, identification information associated with wireless devices 16, and configuration data associated with wireless devices 16.

In one embodiment, WSN hub 34 and any or all of its functions are incorporated into the tablet computer that serves as control panel 20. Particularly, the tablet computer may include a sound detector or microphone 33, an antenna element 34, a processor 40 and memory 42.

Installer interface 18 may include an outside communication device 44, such as a cell phone, standard phone, or computer equipped with a modem; a house phone 46, which may be hard-wired to telephone interface 30 via a telephone line 48; and a manual interface 50, which may be in the form of a keypad or keyboard that is included in the tablet computer that serves as control panel 20. Manual interface 50 may be in communication with WSN hub 24 via option bus 22. Thus, installer interface 18 may be in communication with system controller 14 via public telephone network 32, telephone line 48, and/or option bus 22. Installer interfaces including Ethernet or a networked connection are also possible.

Although only two audible devices 15 are shown in FIG. 1, it is to be understood that security system 10 may include any number of audible devices 15. Audible devices 15 may be in the form of any number or combination of smoke detectors, freezer thaw alarms, heavy equipment back-up warning devices, keyfobs including panic buttons, and any other devices that produce an audible alarm signal. Audible device 15$_1$ is indicated in FIG. 1 as being disposed inside building 12, and audible device 15$_2$ is indicated in FIG. 1 as being disposed outside building 12. However, any number of audible devices 15 may be disposed within building 12, and any number of audible devices 15 may be disposed outside building 12. Types of audible devices that may be permanently or temporarily disposed outside of building 12 during installation may include heavy equipment back-up warning devices and panic devices.

Although only two wireless devices 16 are shown in FIG. 1, it is to be understood that security system 10 may include any number of wireless devices 16. Wireless devices 16 may be in the form of any number or combination of window sensors, door sensors, glass break sensors, inertia sensors, motion detectors, smoke detectors, panic devices, gas detectors and keyfobs, for example. Window sensors and door sensors may detect the opening and/or closing of a corresponding window or door, respectively. Panic devices may be in the form of devices that human users keep on their person, and that are to be used to summon help in an emergency situation. Gas detectors may sense the presence of a harmful gas such as carbon monoxide, or carbon dioxide. A keyfob may be used to arm or disarm security system 10, and is another device that a user may possibly keep on his person. Each wireless device 16 includes a respective antenna element 52 for transmitting and receiving air-borne signals, such as radio frequency signals. The radio frequency signals may be received by and transmitted from, i.e., exchanged with, WSN hub 24. Wireless devices 16$_1$ and 16$_2$ are indicated in FIG. 1 as being disposed inside building 12. However, any number of wireless devices 16 may be disposed within building 12, and any number of wireless devices 16 may be disposed outside building 12. Types of wireless devices that may be permanently or temporarily disposed outside of building 12 during installation may include motion detectors, panic devices and keyfobs.

During installation, some types of audible devices 15 may be mounted or hung in a permanent or semi-permanent desired location. Examples of such types of audible devices 15 may include smoke detectors and freezer thaw alarms. Other types of audible devices 15 may be disposed in temporary locations during installation, or may even be in motion, such as a heavy equipment back-up warning device or a panic device or keyfob being carried on a user's person.

During installation, some types of wireless devices 16 may also be mounted or hung in a permanent or semi-permanent desired location. Examples of such types of wireless devices 16 may include window sensors, door sensors, glass break sensors, inertia sensors, motion detectors, smoke detectors, and gas detectors. Other types of wireless devices 16 may be disposed in temporary locations during installation, or may even be in motion, such as a panic device or keyfob being carried on a user's person.

During installation, the audible security devices 15 may be learned after a discover mode has been entered by actuating certain keys on control panel 20. In the discover mode, hub 24 may be instructed to "discover" audible devices 15 and wireless devices 16 that need to be installed in system 10. Discovering an audible device may include actuating a test button on the audible device in order to cause the audible device to emit its audible alarm signal. Hub 24 may then use its sound detector 33 to determine audio characteristics of the alarm signal, such as its frequency profile and loudness, for example. The installer may use manual interface 50 to enter identifying information about the audible device that emits the alarm signal, such as the type of audible device, an identification number, and/or a location of the audible device. The audible device's identifying information may then be stored in memory 28 in association with the audible device's audio characteristics.

Discovering a wireless device 16 may involve two-way communication between hub 24 and the wireless device. More particularly, discovering a wireless device 16 may include receiving, assigning, or otherwise ascertaining unique identification information and configuration data for that device, such as an identification number, a type of the device, time periods when the device is on and off, supervision intervals (i.e., how often the device should report its status), operational parameters based upon the regulations in which the system is to operate, and/or a function of the device.

In a learn mode of operation, system controller 14 issues an air-borne signal requesting that each wireless device 16 that receives the request reply with an identification number and the type of the device. System controller 14 may store each identification number and its associated type in memory 28 for further reference. The identification number may be any string of alphanumeric characters and/or bits that uniquely identifies the wireless device with which the identification information is associated. This identification number may be included within any signal transmitted from a wireless device, both during installation and during surveillance operation of system 10, in order to identify which of wireless devices 16 that the signal is being transmitted from.

The device type information may specify whether the wireless device is a window sensor, door sensor, glass break sensor, inertia sensor, motion detector, smoke detector, gas detector, panic device or keyfob, for example. The device type information may further break down these categories by subcategories such as indoor or outdoor motion detector, garage door or front door sensor, carbon monoxide or carbon dioxide, etc.

Upon receiving the unique identifier of a device 15, 16, system controller 14 may look up the device's type, which may be stored in memory 28 or may be accessed on-line via the internet. Based on the device type, system controller 14 may make some assumptions about how the device should be configured, as discussed above. System controller 14 then may monitor the device dependent upon the type of the device. As used herein, the term "monitoring" may include supervising the security devices, such as by sending instruction signals to the security devices. The term "monitoring" may also include processing reporting signals from the security devices and deciding what action should be taken in response to the reporting signals. For example, system controller 14 may cause an alarm to issue depending upon both a reported change of status of the security device, and how the device has been configured.

The tablet computer that may serve as control panel 20 may include a camera 56 which may be used to identify an authorized user of security system 10. In the learn mode of operation, camera 56 may capture images of the authorized users. Using facial recognition software running on the tablet computer, system 10 may then later discern whether someone standing in front of control panel 20 and trying to disarm security system 10 is an authorized user who is allowed to disarm the system. For example, when system 10 is armed, and a door sensor 16 senses that an outer door has been opened, system 10 may allow some period of time, such as 60 seconds, for the person walking through the door to enter a security code into the keypad on the control panel and thereby prevent an alarm signal from being transmitted to authorities at CSR 31. However, in another embodiment, camera 56 and the facial recognition software may eliminate, or supplement, the need to enter the security code. That is, if system 10 recognizes the image captured by camera 56 as being the face of an authorized user, then system 10 may be automatically disarmed without the need for the user to enter a security code.

In another embodiment, instead of learning and recognizing the faces of authorized users, gesture recognition software running on the tablet computer is used to determine whether the user has performed a hand gesture or gestures that may be used as a password to disarm system 10. That is, the tablet computer may recognize movement patterns of the user's hand(s) rather than the user's face. For example, the tablet computer's gesture recognition software and camera may determine whether the user has made one or more hand gestures, such as holding up a certain number of fingers and/or moving the tip of his finger in a vertically-oriented circle, for example. If such a pre-programmed and pre-determined hand gesture, or series of hand gestures, is recognized, then security system 10 may be disarmed. In another embodiment, for additional security, system 10 uses both facial recognition and gesture recognition to require that both the user's face and hand gestures be recognized in order to disarm the system.

In one embodiment, system 10 produces intermittent audible beeps after sensing a security breach such as a door opening in order to warn the user that he must either enter the security code or present his face to camera 56 for identification. Once the user's face has been recognized, system 10 may be disarmed and the beeping may stop (or a green light may come on, etc.) in order to inform the user that there is no longer any need for him to enter the security code. If the user's face cannot be recognized, then entering the security code may be sufficient to disarm the security system. In another embodiment, however, both the security code must be entered and the user's face must be recognized in order to disarm the security system.

Upon the completion of learning and/or testing, system 10 may enter an operational mode in which system 10 performs its intended function of providing surveillance. In the operational mode, wireless devices 16 continue to report their statuses according to and dependent upon their configurations, and system controller 14 continues to monitor devices 15, 16 according to and dependent upon the configurations of devices 15, 16.

Each audible device 15 and wireless device 16 may be provided with an LED 54 that may light up or flash to indicate to the installer that the device is transmitting, or has recently transmitted, some type of signal. If the LED does not light up or flash at the desired device, then the installer may need to perform some troubleshooting. For example, the installer may check the battery (not shown) of the device or replace the device with another one.

There may be an occasion when the default configuration that control system 14 has assigned to a device 15, 16 needs to be changed to suit a particular application. In order to modify the configuration of a device, a user may access manual interface 50 and key in replacement configuration data for the device.

During installation, the tablet computer is loaded with software that causes the tablet computer to give its security functions priority over its non-security functions. For example, as long as there is at least one security function to be performed, the tablet computer will always perform the security function before performing any non-security function. Security functions may include, for example, transmitting an alarm signal to the central monitoring station in response to the security sensor sensing a security breach associated with the building. Non-security functions may include, for example, word processing, electronic mail, electronic instant messaging with another personal electronic computing device, capturing photographic images, interpreting user writing with a stylus on a touch-sensitive screen, and/or internet browsing.

During installation, the tablet computer is mounted on a wall in the secured building by use of a dock (not shown), which may include a power outlet, electrical connections between the tablet computer and the security system, and possibly other interfaces. Thus, the user can then use the tablet computer as a security system interface.

During use, one of audible devices $15_1$, $15_2$ may sense an alarm condition and respond thereto by emitting an audible alarm signal. Sound detector 33 receives and detects the audible alarm and processor 26 recognizes the sound as an alarm signal by virtue of its sound characteristics, such as frequency profile and/or loudness. In one embodiment, processor 26 may determine which of audible devices $15_1$, $15_2$ has emitted the audible alarm signal by analyzing the sound's identifying characteristics. If, for example, processor 26 determines that an audible device in the form of a smoke detector is emitting the sound, then this identification may be forwarded to CSR 31 such that the proper authorities, e.g., the local fire department, may be notified to respond to the alarm.

In one embodiment, sound detector 33 is in the form of a microphone on the tablet computer that serves as control panel 20. The microphone may be used to identify an authorized user of security system 10. In the learn mode of operation, the microphone may record the speaking voices of the authorized users. Using voice recognition software running on the tablet computer, system 10 may then later discern whether someone speaking in front of control panel 20 and trying to disarm security system 10 is an authorized user who is allowed to disarm the system. For example, when system 10 is armed, and a door sensor 16 senses that an outer door has been opened, system 10 may allow some period of time, such as 60 seconds, for the person walking through the door to enter a security code into the keypad on the control panel and thereby prevent an alarm signal from being transmitted to authorities at CSR 31. However, in another embodiment, the microphone and the voice recognition software may eliminate, or supplement, the need to enter the security code. That is, if system 10 recognizes the voice captured by the microphone as being the voice of an authorized user, then system 10 may be automatically disarmed without the need for the user to enter a security code.

In another embodiment, instead of learning and recognizing the voices of authorized users, speech recognition software running on the tablet computer is used to determine whether the user has spoken a security code or password(s) that may be used to disarm system 10. That is, the tablet computer may recognize the content of the user's speech rather than the user's voice characteristics. For example, the tablet computer's speech recognition software and microphone may determine whether the user has spoken a code phrase, such as "Mary had a little lamb," and, if so, security system 10 may be disarmed. In another embodiment, for additional security, system 10 uses both voice recognition and speech recognition to require that both the user's voice be recognized and the user speak a code word or phrase in order to disarm the system.

In one embodiment, system 10 produces intermittent audible beeps after sensing a security breach such as a door opening in order to warn the user that he must either enter the security code, speak so that his voice can be recognized, or speak the passcode in the vicinity of the microphone. Once the user's voice or spoken passcode has been recognized, system 10 may be disarmed and the beeping may stop (or a green light may come on, etc.) in order to inform the user that there is no longer any need for him to enter the security code. If the user's voice and/or passcode cannot be recognized, then entering the security code may be sufficient to disarm the security system. In another embodiment, however, both the security code must be entered and the user's voice and/or spoken passcode must be recognized in order to disarm the security system.

It is to be understood that it is within the scope of the invention for any combination of the above-described virtual passwords be required to disarm the security system. That is, system 10 may require any combination of facial recognition, gesture recognition, voice recognition, spoken passcode recognition, and/or a keyed-in passcode in order for system 10 to be disarmed.

An off-the-shelf tablet computer includes several built-in features, functions and/or applications that may be taken advantage of when the tablet computer is used as the control panel and/or user interface of a home security system. More particularly, as discussed above, the tablet computer may include a camera 56 and microphone 33 that may enable a user to have a video and audio chat with the security office (e.g., CSR 31). For example, if an alarm signal has been falsely transmitted to CSR 31, such as if the user fails to enter a passcode after returning home, then the user may have a video/audio conference with personnel at CSR 31 in order to convince the personnel that there has been no break-in, and that there is no need to dispatch police to the building. In order to better enable the personnel to identify the person on the video/audio chat as an authorized user, camera 56 may capture images of all authorized users during installation, and these images may be transmitted to, and logged at, CSR 31 so that the personnel may refer to the logged images and verify the identity of the authorized user in real time during the video chat. Similarly, voice samples of authorized users may be recorded during installation and transmitted to, and logged at, CSR 31 so that the personnel may refer to the logged audio recordings during the video/audio chat.

Camera 56 may also enable a user to leave a video message for another authorized user of the security system. A problem with leaving any type of conventional message for a housemate is that it is difficult to ensure that the message is received. That is, if a message is written on paper, it may not be seen by the recipient, or may be seen by another unintended party. Even a voice message on the user's personal electronic device may not be received if the recipient does not check his device. According to the invention, however, a user may use camera 56 and microphone 33 to record a video/audio message for a housemate. For example, manual interface 50 may include a button labeled "message" that the user may touch or push to immediately thereafter record the message (e.g., "please feed the dog"). Optionally, after the message has been recorded, the user may then enter a personal passcode of the intended recipient. The user may then arm the security system and leave the premises. When the housemate enters the house and enters his passcode (which is the one action by the housemate that is almost certain), the recorded message is played back in video and audio for the housemate. If the recording user entered the intended recipient's passcode, then the message is played back only if the housemate's passcode that he keyed in matches the intended recipient's passcode as entered by the recording user.

The user may also use this message feature to leave a reminder message for himself when he returns, perhaps specifying his own passcode. For example, the user may want to remind himself to "take out the trash" when he arrives home.

Camera 56 may also be used to read a printed passcode carried by the user. For example, the user may carry an identification card with a bar code or QR code that camera 56 may scan or capture an image of. Processor 26 may then compare the code to a list of approved codes in order to verify that the person is an authorized user.

A tablet computer also includes a relatively large display screen (e.g., as part of manual interface 50) that the invention may take advantage of in order to provide additional functionality beyond that of a conventional security system interface. For example, the display screen of the tablet computer may be used to display a daily or weekly schedule for each of the people living in the building. The tablet computer may be synchronized with the residents' personal electronic devices, and each resident's personal calendar may be automatically imported to the tablet computer from the resident's personal electronic device. This importation of calendars may occur wirelessly when the personal electronic device is brought into the vicinity of the tablet computer. The resident's calendar may be displayed briefly (e.g., for 30 seconds) on the tablet computer in response to the resident entering his passcode into the tablet computer when arming or disarming the security system. Alternatively, the resident's schedule may be displayed whenever the resident is recognized by facial or voice recognition, or after the resident enters his passcode visually or audially, as described above.

When displaying a schedule, and perhaps when not displaying a schedule, the tablet computer may display the current time and date. The relatively large display screen of the tablet computer may accommodate the display of a round analog clock face with hands for easy viewing and recognition of the current time by the user, even at a substantial distance from the display. The tablet computer may display the weather forecast or news as received wirelessly or via public telephone network 32. The relatively large display screen of the tablet computer may accommodate the display of weather graphics, such as the degree of cloud cover and rain drops, as well as televised news, such as CNN, etc.

In another embodiment, the tablet computer's large display screen is used to display QR codes for diagnostic or status updates. For example, a security system installer or repairman may scan the displayed QR code to ascertain the status or failure mode of system 10. Alternatively, the user may use his personal electronic device to scan or photograph the QR code displayed on the tablet computer, and then the user may electronically transmit the scanned or photographed information to security system repairmen who are located remotely.

The tablet computer may also be used to perform other non-security functions that are independent of, or unrelated to, the primary security functions of the tablet computer. For example, the tablet computer may be connected to, and may be programmed to control, a home automation system. The come automation system may, for example, starting brewing coffee each morning at 6:00 am, or may open or close drapes in order to let in or keep out sunlight as desired. In order to provide an interface for home automation functionality, the tablet computer may be connected to a networked dock having wireless communication capability. In one embodiment, Zigbee, Zwave, or another wireless system or protocol may be built into the networked dock.

In another embodiment, the tablet computer is used as the user interface and thermostat of the building's Heating Ventilation Air Conditioning (HVAC) system. The tablet computer may be programmed to output certain voltages to turn on or turn off the HVAC system in response to input voltages representing measured temperatures and set temperatures input by the user.

In yet another embodiment, the wi-fi connection capability of the tablet computer is used to enable communication with other diagnostic tools and interface devices. For example, the user may be able to communicate with and control the security system via the tablet computer and some wi-fi enabled device, such as a user's personal electronic device, personal computer, or personal entertainment remote controller. The wi-fi communication capability of the tablet computer may also enable the security system to wirelessly communicate with a repairman's wi-fi enabled diagnostic device.

Figure 2:
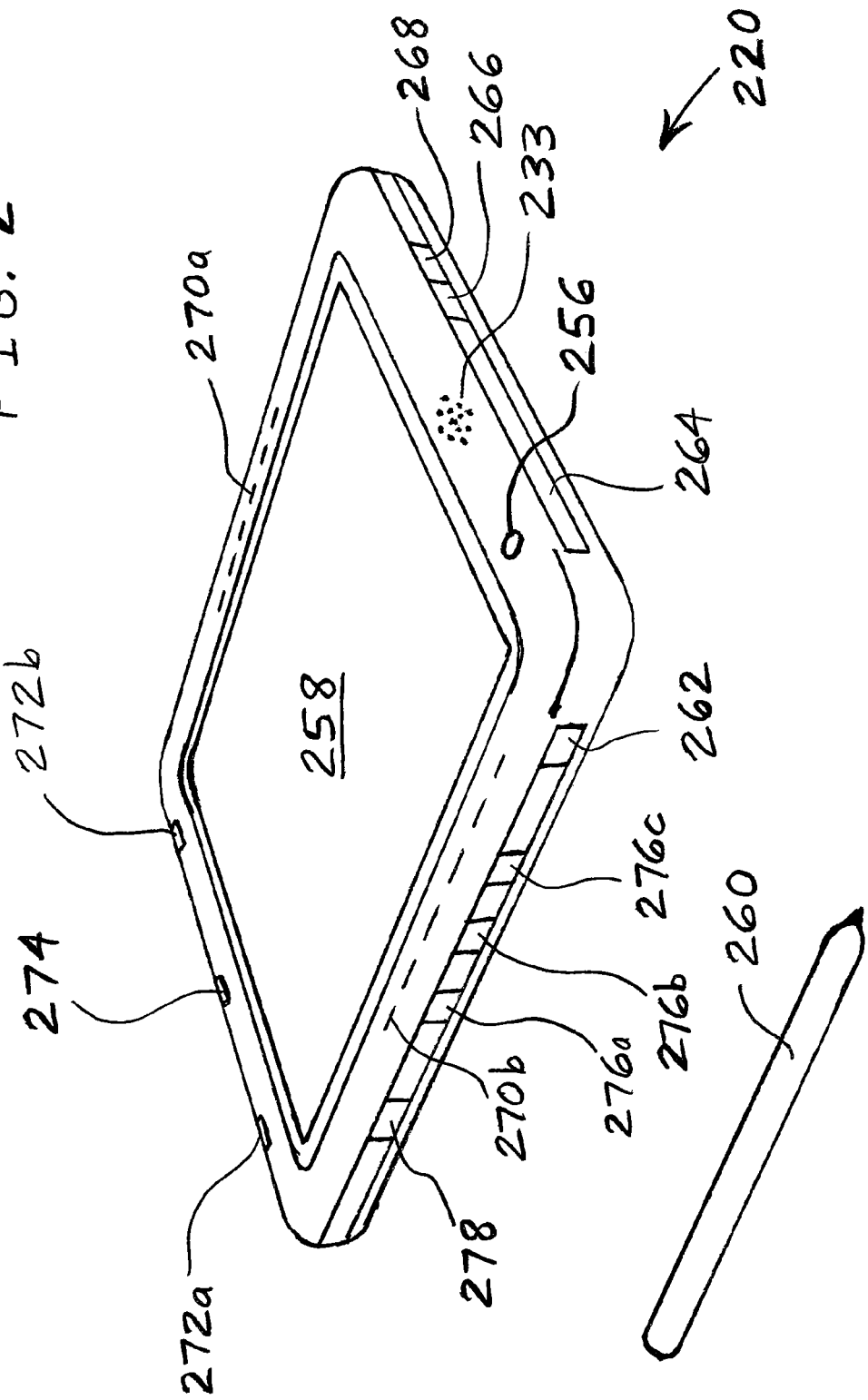
FIG. 2 is a perspective view of one embodiment of a tablet computer suitable for use as the control panel of the building security arrangement of FIG. 1.

Another embodiment of a tablet computer 220 is shown in FIG. 2 including a display screen 258. A pen or stylus 260 may be included for writing or selecting icons on display screen 258. Tablet computer 220 may also include a microphone 233, camera 256, power switch 262, PC card/compact flash slot 264, video graphics array connector 266, USB connector 268, antennas 270a-b, stereo speakers 272a-b, stereo headset 274, programmable launch buttons 276a-c, and jog dial 278.

Figure 3:
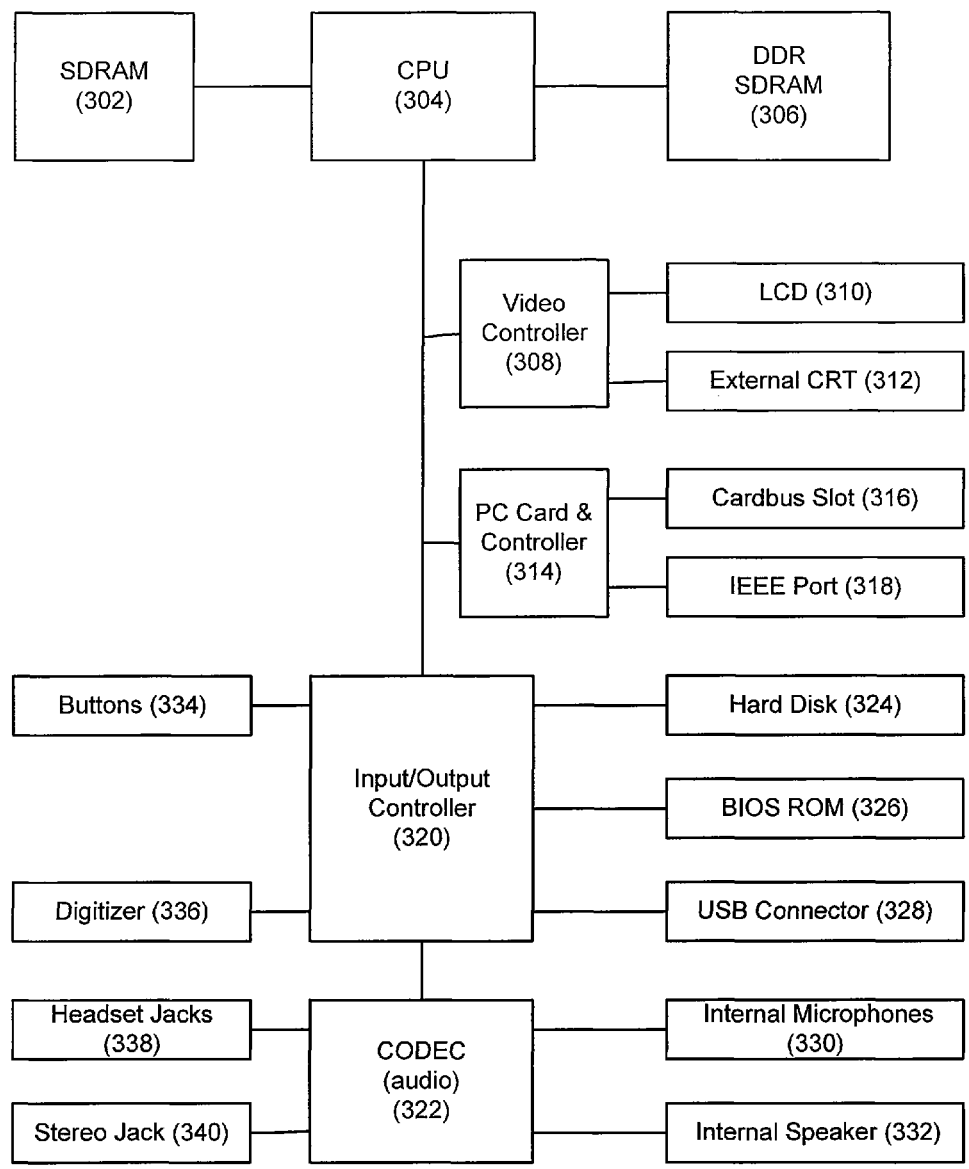
FIG. 3 is a block diagram of another embodiment of a tablet computer suitable for use as the control panel of the building security arrangement of FIG. 1.

A block diagram of yet another embodiment of a tablet computer 300 is shown in FIG. 3. Tablet computer 300 includes synchronous dynamic random access memory (SDRAM) 302, CPU 304, double data rate synchronous dynamic random access memory (DDR SDRAM) 306, video controller 308, LCD display 310, external CRT 312, PC card and 1394 controller 314, cardbus slot 316, IEEE 1394 port 318, super I/O controller (southbridge) 320, codec 322, internal hard disk 324, basic input/output system read only memory (BIOS ROM) 326, USB connector 328, internal microphones 330, internal speaker 332, buttons 334, digitizer 336, headset jacks 338, and stereo jack 340.

Figure 4:
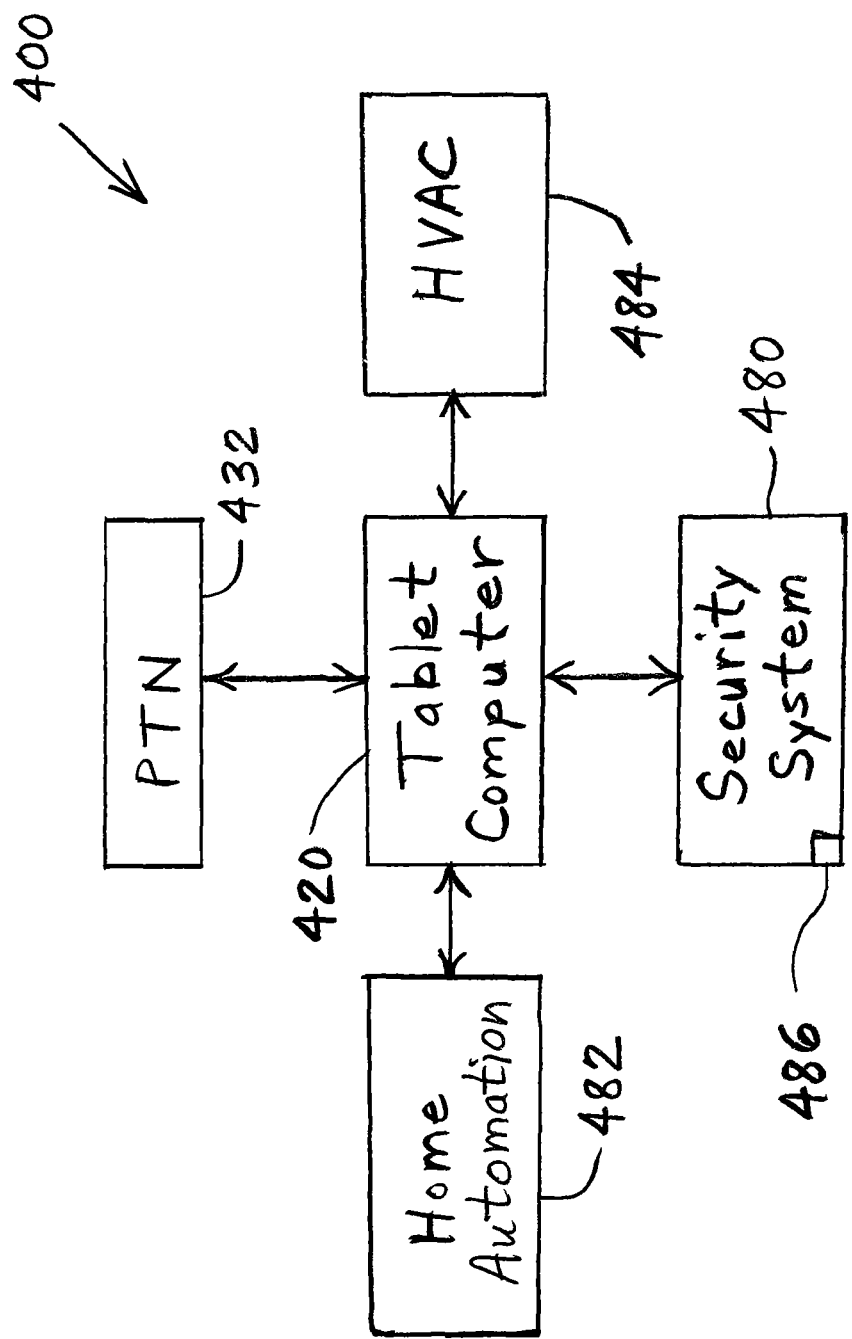
FIG. 4 is a block diagram of one embodiment of a home system control arrangement of the invention.

One embodiment of a home system control arrangement 400 is shown in FIG. 4. A tablet computer 420 is used to control a security system 480, a home automation system 482 and an HVAC system 484. Tablet computer 420 may communicate with entities outside of the building through a public telephone network 432. For example, if security system 480 senses a security breach, then tablet computer 420 may respond by transmitting an alarm signal to a central monitoring station via public telephone network 432. In addition, tablet computer 420 may transmit emails wirelessly or via public telephone network 432 to a user to inform him of changes in status to any of security system 480, home automation system 482 and HVAC system 484. Tablet computer 420 may also enable a user to telephonically and remotely control any of security system 480, home automation system 482 and HVAC system 484 wirelessly or via public telephone network 432. For example, a user may remotely arm or disarm security system through tablet computer 420. The user may also remotely turn on or turn off the heating or air conditioning of HVAC 484 and/or change a set temperature for the heating or air conditioning. Further, the user may remotely turn on or turn off home automation apparatus such as a conventional oven, a microwave oven, a particular electrical outlet, or a drape opening and closing mechanism, for example.

In one embodiment, security system 480 includes a pan, tilt, zoom surveillance camera 486 which may transmit the images it captures to a remotely disposed user via tablet computer 420. The images may be transmitted wirelessly or via public telephone network 432. Also, the user may remotely control the pan, tilt and zoom movements of camera 486 in order to capture the images that the user would like to see.

While this invention has been described as having an exemplary design, the invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A building security system comprising:
   a security sensor configured to sense a security breach associated with a building; and
   an off-the-shelf portable personal electronic computing device installed within the building and communicatively coupled to the security sensor and to a central monitoring station, the computing device being programmable to transmit an alarm signal to the central monitoring station in response to the security sensor sensing a security breach associated with the building, the computing device including a microphone and/or a camera, wherein, upon one of the sensors sensing a security breach, the computing device is configured to inhibit an alarm signal from being transmitted to the central monitoring station upon using the microphone to recognize an authorized user entering the building via voice recognition and/or speech recognition, and/or using the camera to recognize an authorized entering the building user via facial recognition and/or gesture recognition.

2. The system of claim 1 wherein the portable personal electronic computing device comprises a tablet computer.

3. The system of claim 1 wherein the portable personal electronic computing device is remotely controllable by the central monitoring station.

4. The system of claim 1 wherein the portable personal electronic computing device is configured to perform a plurality of non-security functions.

5. The system of claim 4 wherein the non-security function comprises word processing, electronic mail, electronic instant messaging with another personal electronic computing device, capturing photographic images, interpreting user writing with a stylus on a touch-sensitive screen, and/or internet browsing.

6. The system of claim 1, wherein the portable personal electronic computing device is configured to:
   perform a plurality of security functions; and
   perform a plurality of non-security functions, wherein the performance of the non-security functions is delayed until all pending said security functions have been performed.

7. The system of claim 1 wherein the computing device is configured to enable a user to participate in a video and audio chat with personnel at the central monitoring station.

8. The system of claim 7 wherein the computing device is configured to capture an image and/or voice recording of an authorized user and transmit the image and/or
   voice recording for logging at the central monitoring station such that an identity of the authorized user may be verified in real time by personnel at the central monitoring station during the video and audio chat.

9. The system of claim 1 wherein the computing device is configured to enable a user to leave a video and/or audio message for an other user such that the message is played back for the other user upon the other user entering his passcode.

10. The system of claim 1 wherein the computing device is configured to control a home automation system and/or an HVAC system.

11. The system of claim 1 wherein the computing device is configured to enable a user to remotely and telephonically control a home automation system and/or an HVAC system.

12. The system of claim 1 further comprising a pan, tilt, zoom camera, the computing device being configured to transmit images captured by the camera to a remotely disposed user, and enable the user to remotely and telephonically control pan, tilt and zoom movements of the camera.

13. A building security system comprising:
a plurality of security sensors configured to sense a security breach associated with a building; and
an off-the-shelf portable personal electronic computing device communicatively coupled to the security sensors and to a central monitoring station, the computing device being configured to:
perform a plurality of security functions including transmitting an alarm signal to the central monitoring station in response to at least one of the security sensors sensing a security breach associated with the building;
perform a plurality of non-security functions including word processing, electronic mail, electronic instant messaging with another personal electronic computing device, capturing photographic images, interpreting user writing with a stylus on a touch-sensitive screen, and/or internet browsing, wherein the computing device assigns higher priority to each of the security functions than to any one of the non-security functions such that the computing device performs each pending said security function before performing any pending said non-security function; and
enable a user to leave a video and/or audio message for an other user such that the message is played back for the other user upon the other user entering his passcode.

14. The system of claim 13 wherein, upon one of the sensors sensing a security breach, the computing device is configured to inhibit an alarm signal from being transmitted to the central monitoring station upon recognizing an authorized user via voice recognition, speech recognition, facial recognition, and/or gesture recognition.

* * * * *